US007639272B2

(12) United States Patent
Hanks et al.

(10) Patent No.: US 7,639,272 B2
(45) Date of Patent: Dec. 29, 2009

(54) DEVICE AND METHOD FOR OPTICAL SCANNING

(75) Inventors: D. Mitchel Hanks, Fort Collins, CO (US); Lawrence Nathaniel Taugher, Loveland, CO (US); Greg J. Lipinski, Loveland, CO (US); Kevin L. Colburn, Greeley, CO (US); Charles R. Weirauch, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 488 days.

(21) Appl. No.: 11/263,724

(22) Filed: Oct. 31, 2005

(65) Prior Publication Data

US 2007/0070170 A1 Mar. 29, 2007

Related U.S. Application Data

(63) Continuation-in-part of application No. 11/236,113, filed on Sep. 26, 2005.

(51) Int. Cl.
*B41J 2/47* (2006.01)
*B41J 15/14* (2006.01)
*B41J 27/00* (2006.01)

(52) U.S. Cl. ........................ 347/225; 347/243; 347/260

(58) Field of Classification Search ......... 347/224–225, 347/231, 243, 259–261; 369/112.24
See application file for complete search history.

(56) References Cited

U.S. PATENT DOCUMENTS 5,828,644 A * 10/1998 Gage et al. ............. 369/112.24
6,545,970 B2 * 4/2003 Durnin et al. .......... 369/112.24
6,992,968 B2 * 1/2006 Ueyanagi ............... 369/112.24

* cited by examiner

*Primary Examiner*—Hai C Pham

(57) ABSTRACT

An optical scanning device and method are provided for marking an optically sensitive layer. The device can include an optical source capable of emitting a beam. At least one pivot can be configured to enable the beam to travel through a beam output arc. In addition, a mirror surface can be oriented toward the optically sensitive layer. The mirror surface can be configured to reflect the beam within the defined beam output arc onto a plurality of locations of the optically sensitive layer.

24 Claims, 9 Drawing Sheets

DEVICE AND METHOD FOR OPTICAL SCANNING

CROSS-REFERENCE TO RELATED APPLICATIONS

This is a continuation-in-part of co-pending U.S. application Ser. No. 11/236,113, by VanBrocklin et al., filed on Sep. 26, 2005 entitled "Optical Printhead". That application is assigned to the assignee of the present invention and is hereby incorporated by reference in its entirety.

BACKGROUND OF THE INVENTION

Optical disks represent a significant percentage of the market for data storage of software as well as photographic, video, and audio data. Typically, optical disks have data patterns contained on the disk that can be read from one side of the disk, and a graphic display printed on the other side of the disk. Various optical disk formats are currently available such as CD, CD-ROM, CD-R, CD-RW, DVD, DVD-R, DVD-RW, DVD+R, DVD+RW, HD DVD, and Blu-ray. Other optical disk formats are also available.

In order to identify the contents of the optical disk, printed patterns or graphic display information can be provided on the non-data side of the disk. The patterns or graphic display can be both decorative and provide pertinent information about the data content of the disk. In the past, commercial labeling has been routinely accomplished using screen-printing methods. While this method can provide a wide variety of label content, it tends to be cost ineffective for the production of less than about 400 disks because of the fixed costs associated with preparing a stencil or combination of stencils and printing the desired pattern or graphic display.

In recent years, the significant increase in the use of optical disks for data storage by consumers has increased the demand to provide customized labels to indicate the content of the optical disk. Most consumer available methods of labeling include either handwritten descriptions or preprinted labels which may be affixed to the disk, but handwritten labels lack a professional appearance while affixed labels may adversely affect the disk performance upon spinning at high speeds.

Recently, a variety of dye-containing compositions have been developed for use on optical disks as disk labeling technology. In particular, disk labeling technology exists that forms text and/or graphics directly onto the label side of a CD or DVD using the optical drive's laser and a specially coated disk.

The coating on a dye-containing disk can change color or chemical structure when it's exposed to the CD/DVD drive's laser. The process is similar to film exposure, except the surface reacts specifically to the intense light of a particular wavelength emitted by the laser.

Forming an image onto a label side of a disk typically involves several components. These components include an optical drive that selectively outputs the laser light onto corresponding locations on the disk surface to form the spots that make up the labeled image. In addition, a disk with a label side layer containing a photosensitive dye layer is used. Software is used to manage the imaging process of the optical drive and determine which locations on the disk will be optically exposed and which locations will not be exposed.

One characteristic of many such label creation systems is that the disk must be flipped over in the drive after the digital data has been written to it in order to then form the image on the label side of the disk. This can be time consuming and inconvenient to a user.

DETAILED DESCRIPTION

An embodiment of the present device and method provides an optical scanning device for an optical disk. The optical scanning device is provided to allow a user to write images to an optically sensitive surface or disk without requiring the surface to be flipped over from the data side to a labeling side that contains optically sensitive material. This also means that optical imaging components may be located on the side of the optically sensitive surface or disk where a layer of optically sensitive material exists.

Figure 1:
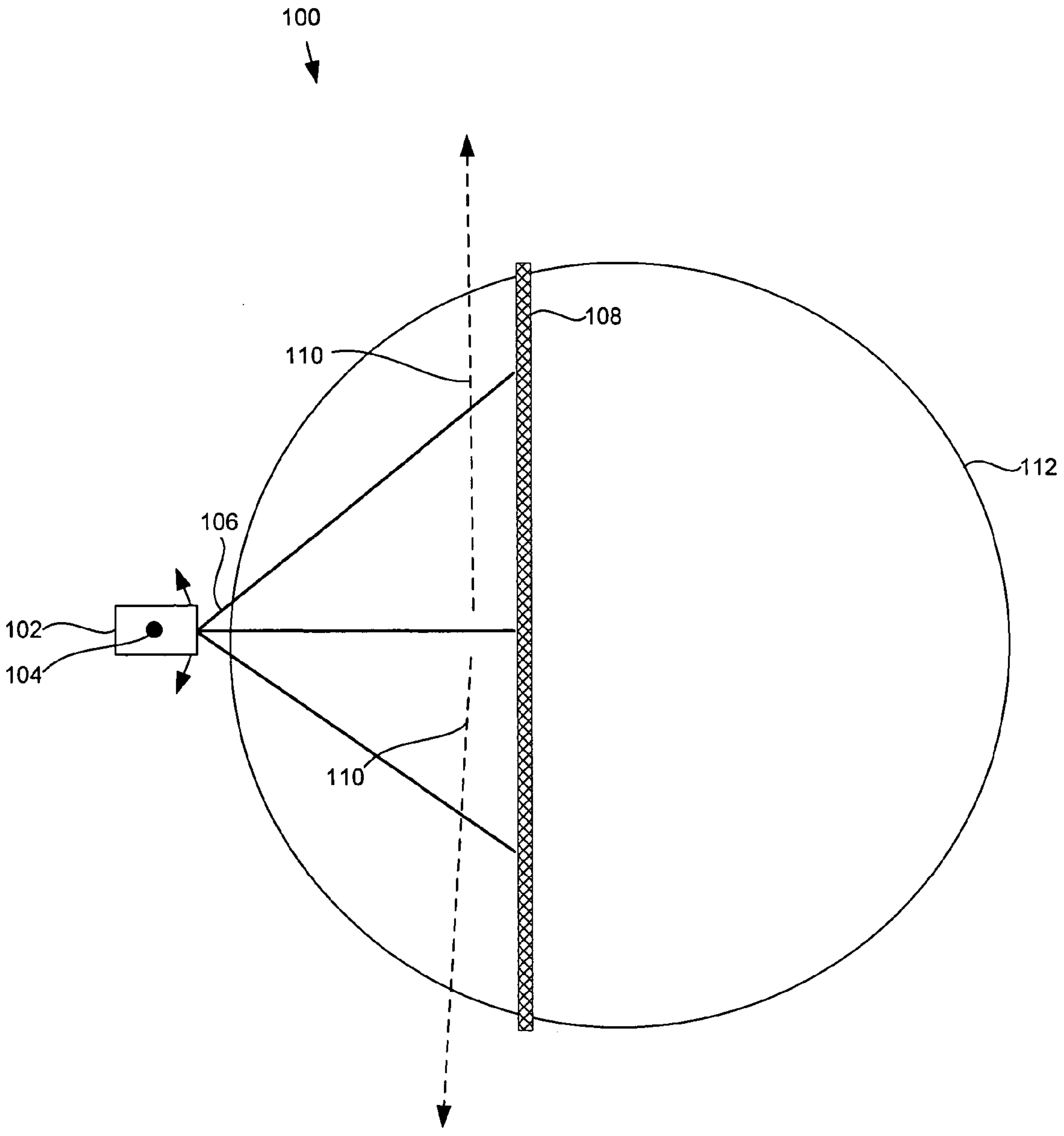
FIG. 1 illustrates a device for optical scanning in accordance with an embodiment of the present invention.

FIG. 1 illustrates an embodiment of the optical scanning device 100 that includes an optical source 102 capable of emitting a beam 106. The beam may be a laser source of a defined wavelength or some other visible or non-visible optical source that may be used in reading and writing to an optical disk. In addition, the beam may be a long focal length beam that is emitted from the optical source, which has specific optics to create a long focal length.

A pivot 104 is coupled to the optical source 102. The pivot may be configured to enable the beam to travel through a beam output arc 110 or a traversal range. The term "arc" is used here to describe that the beam may move through a number of defined increments (e.g., degrees, etc.) in an arcuate fashion. However, the actual path of the beam can be arcuate, linear, or piecewise linear.

A mirror surface 108 may be oriented toward the optical disk 112. The mirror surface can be configured to reflect the beam onto the optical disk at a plurality of track locations accessible by the beam output arc. The pivot can be actuated to enable the beam to be reflected off of a plurality of points on the mirror and this enables modifiable tracks on the optical disk to be accessed by the beam when the surface of the optical disk is rotating or otherwise moving. In some embodiments, a radial position or track position can be accessed simply by changing the angle of the pivot with respect to the mirror and/or changing the mirror angle with respect to the optical source, and this in turn changes the angle of the beam that is hitting the optical disk.

Using a pivot may be advantageous because it can reduce the movement of the optical source or optical head. Specifically, a pivot that directs a beam out to a reflector has less mass than an arm which extends out to support another reflecting surface. In addition, a pivot is smaller and has less mass than a linear sled and rail system. The optical source may be a collimated laser beam and it is desirable to minimize the mass of the head to improve actuation speed and reduce the power required to drive the head motion. Minimizing the mass decreases the motor size and cost, power consumed, and parts costs.

There can be multiple reasons for addressing tracks on an optical disk. In one embodiment, a variety of dye-containing compositions (leucodyes) are used as a layer in optical disks as disk labeling technology. The optical device can form text, graphics, or other images directly onto the label side of a CD or DVD by using the optical source (e.g., laser) to form visible spots on a specially coated disk. The coating on a dye-containing disk can change color or chemical form when the dye is exposed to the CD/DVD drive's laser. In other words, an optical disk may include a photosensitive dye layer. The process of modifying the dye layer is similar to a film exposure, except the surface reacts specifically to the intense laser lights of specific wavelengths.

The embodiment described in FIG. 1 may be used on the non-data side of the optical disk, while an optical pickup unit (OPU) with the data reading and writing laser heads mounted on a movable sled are used on the data side of the optical disk. In such a disk drive, both the labeling operations and the data write or read operations may occur simultaneously, advantageously reducing the time required to form a label image as compared to disk drives in which these operations are performed sequentially.

The described embodiments are simpler and less costly than adding a second OPU-based arrangement for the label side, because the embodiments avoid using several of the motors and other moving parts associated with positioning and focusing the laser beam at the desired locations on the surface of the disk. The elimination of a number of moving parts may significantly reduce the electrical power that is used to move the optical source or optical unit for the label side head, since this configuration of the optical unit in the present embodiments has a reduced mass and inertia. The resulting reduction in mass and inertia is because the moving member is the laser source and the associated optics and the reflectors are fixed. If the reflectors were to move with the beam, as might be done in other designs, the pivoting member would need to be long enough to support the moving reflector at the point where the beam is directed down to the disk, thus increasing the mass and inertia of the moving member.

The design of the present embodiments allow a labeling device to significantly reduce the cost of the optics by using a low numerical-aperture (NA) lens to focus the beam at a distance of a plurality of centimeters. This produces a longer depth of focus and reduces the focusing requirements for the optical head. Providing a beam having a long depth of focus allows the scanning scheme described herein to be implemented.

Because the beam can be directed to any radial position on the disk, and the disk can rotate beneath the beam, any radial or circumferential position on the disk can be accessed, in much the same way as a hard disk drive head can access all data locations on a disk surface. As a result, an image may be formed on a 2-dimensional area of the media. One dimension may be covered by the combination of the optical source and mirror, and another dimension may be covered by the rotation of the medium upon which the image is formed.

Figure 2:
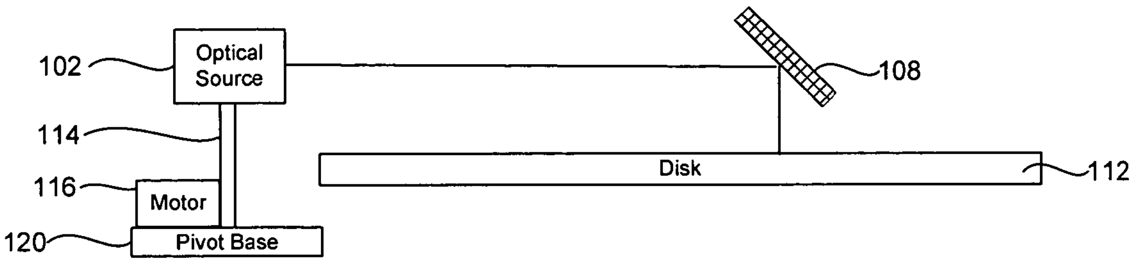
FIG. 2 illustrates a side view of a device for optical scanning in accordance with an embodiment of the present invention.

FIG. 2 further illustrates that the mirror surface 108 a mirror bar. The mirror bar 108 may be oriented toward the optical disk 112 which enables the laser beam to impinge the surface of the optical disk. Because the mirror bar crosses a substantial portion of the disk, this may allow each track on the disk to be impinged by the beam.

In an embodiment where a straight mirror bar is used, the track spacing may increase for a given angular step of the beam source as the beam moves away from the center point towards the sides. This error may be compensated for in the mirror bar servo positioning system by determining the projection angles in advance. Then the expected error can be determined and the angular step can be reduced by the amount that is necessary to provide the correct track spacing.

A pivot base 120 is also illustrated in FIG. 2 to which the pivot 114 is attached. A pivot motor 116 may be coupled to the pivot and pivot base to enable the optical source to move through an arc. Alternatively, the optical source can be fixed to the pivot base and the entire pivot base can be driven by a geared control or an independent pivot motor.

In order to enable position feedback, the bar mirror may be patterned with alternating reflective and non-reflective bars. Each reflective region may pass all the light to the disk surface and back to a photo detector. By monitoring the photo detector for positions where the reflected light is the strongest, the track centers on the optical disk may be located.

Figure 3A:
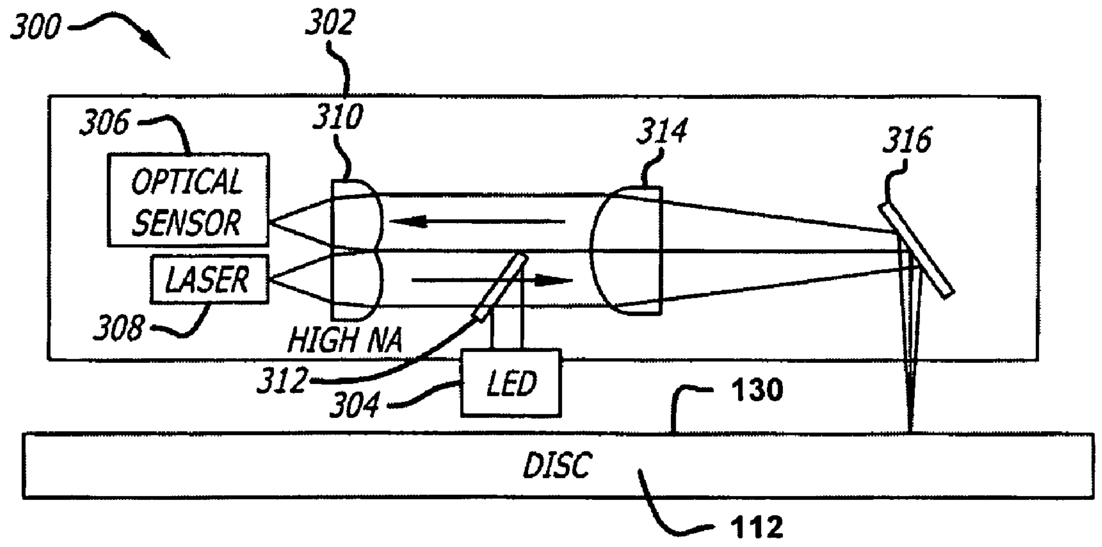
FIG. 3*a* shows an example embodiment of an optical printhead (OPH) for a label side of a disc according to an embodiment of the present invention.

FIG. 3 shows an example embodiment of an optical pickup head (OPH) 300 for a label side of a disc. The OPH 300 is suitable for inclusion in the optical source. In this example embodiment, the OPH 300 includes a housing 302, a light emitting diode (LED) or other light source 304, an optical sensor 306, a laser 308, a high numerical aperture (NA) lens 310, a dichroic mirror 312, a lens 314 and a mirror 316, configured as shown.

The laser 308 generates a laser beam of a particular wavelength (e.g., 780 nm) which is directed along an optical path through the high NA lens 310 and the lens 314, and reflected by the mirror 316 through an opening in the housing 302 to be incident upon the label side 130 of the disc 112 thereby creating laser-formed optically visible marks that correspond to label image data. In this example embodiment, the optical path does not include a mechanism for repositioning an objective lens in order to properly focus the laser beam on the label side 130. Nor does the optical path include a beamsplitter.

In an example embodiment, an apparatus, for a disc with a label side and a data side, the label side including material that forms an optically visible spot in response to energy of a predetermined wavelength, includes an optical printhead, a laser configured to impart energy of the predetermined wavelength, and means for fixing a focus of the energy in relation to the label side. In an example embodiment, the means for fixing a focus does not include a mechanism for repositioning an objective lens.

In an example embodiment, visible light generated by the LED 304 (e.g., a visible wavelength LED, for example 650 nm) or a laser, example wavelength 650 nm, is reflected by the dichroic mirror 312, directed through the lens 314, and reflected by the mirror 316 to be incident upon the label side 130 of the disc 112. Light reflected back from label side 130 is reflected by mirror 316, transmitted through lens 314 and the lens 310 with high NA on the object (sensor) side, and directed toward the optical sensor 306. In an example embodiment, the optical sensor 306 is used for reading the media ID and for optical power calibration (OPC). There is no need for a "focus" sensor. The dichroic mirror 312 and LED 304 provide illumination for the sensor 306 at a different wavelength from the laser 308. In an example embodiment, the LED wavelength is chosen such that a large signal will be returned for use in OPC. If 780 nm (the same wavelength used for marking) were to be used for OPC, then there would be very little difference in reflected light between marked and unmarked portions of the disk, since the 780 nm absorbing property of the disk is retained after marking. However, a human visible wavelength of light such as 650 nm (Red) provides a large decrease in reflectivity when media such as LightScribe media is marked. This is because the LightScribe media is designed to have high reflectivity across the visible spectrum before marking, and low reflectivity after marking. It should be understood that the principles described herein are not limited to use with a particular type or brand of media.

In this example embodiment, the optical sensor 306 is a "sum sensor". When the sum of measured irradiance directed at the sensor 306 is at a relative maximum, it is an indication that the laser beam is in focus on media and that media is present in the drive. When this optical assembly is moved over the media ID portion of the disc, the light reflected will correspond to the spokes and spaces of the media ID.

In an example embodiment, the optical sensor 306 is configured to read data (e.g., identification data) from the label side 130 when the label side 130 is illuminated by the LED 304. For example, data may be encoded in the form of a sequence of high and low reflectivity regions in a band near the inner diameter of the disk. By shining light on these regions and detecting the amount of reflected light, the data encoded can be determined.

Figure 3B:
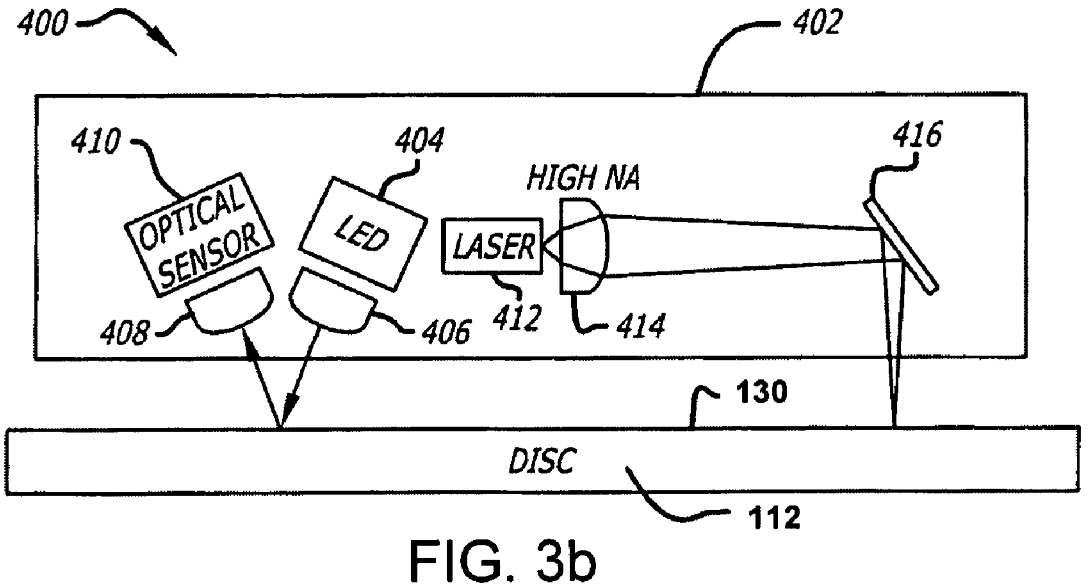
FIG. 3*b* shows another example embodiment of an OPH for a label side of a disc according to an embodiment of the present invention.

FIG. 3*b* shows another example embodiment of an OPH 400 for a label side of a disc. The OPH 400 is suitable for inclusion in the optical source. In this example embodiment, the OPH 400 includes a housing 402, a light emitting diode (LED) or other light source 404, lenses 406 and 408, an optical sensor 410, a laser 412, a lens 414 with a high numerical aperture (NA) on the object (laser) side and a mirror 416, configured as shown.

The laser 412 (e.g., a 780 nm laser) generates a laser beam which is directed along an optical path through the high object side NA lens 414, and reflected by the mirror 416 through an opening in the housing 402 to be incident upon the label side 130 of the disc 112 thereby creating optically visible laser marks that correspond to label image data. In this example embodiment, the optical path does not include a mechanism for repositioning an objective lens. Nor does the optical path include a beam splitter.

In an example embodiment, visible light generated by the LED 404 (e.g., a red LED having a wavelength of approximately 650 nm) is directed through the lens 406 to be incident upon the label side 130 of the disc 112. Light reflected back passes through the lens 408 and is directed toward the optical sensor 410, which can be used to read the media ID and to indicate that the disk is positioned correctly underneath the assembly. In this example embodiment, the optical sensor 410 can be a sum sensor (e.g., as previously described) or another type of sensor. In an example embodiment, the optical sensor 410 provides outputs to a controller, for example, to facilitate an optical power calibration (OPC) function. In an example embodiment, the optical sensor 410 is configured to read data (e.g., identification data) from the label side 130 when the label side 130 is illuminated by the LED 404.

Figure 4:
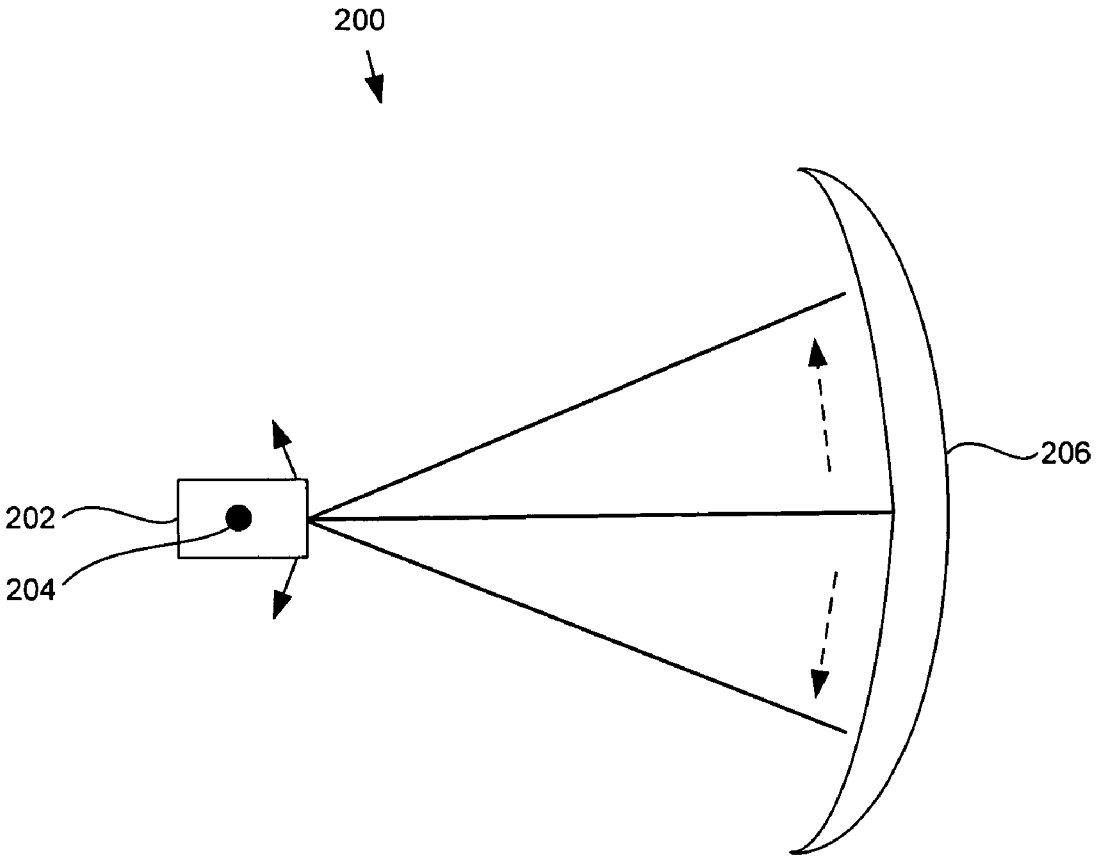
FIG. 4 illustrates a view of a device having a curved concave mirror surface for optical scanning in accordance with an embodiment of the present invention.

FIG. 4 illustrates an embodiment 200 where the mirror surface or mirror bar can be a curved mirror surface 206. The curved mirror surface can be concave toward the center of the optical disk and this may allow the tracks on the optical surface to be accessed in a more accurate manner.

The error compensation that is used with a straight mirror bar has been described previously. In contrast, when a mirror forms an arc such that the distance from the pivot point of the beam source to the mirror surface remains constant, then the mirror or mirror bar may not need to be moved or have error compensation. A curved surface allows the beam distance to remain constant.

A beam feedback system can be provided with the curved mirror surface or bar mirror. The beam can reflect off the mirror down to the disk surface where the beam can form visible spots on the print medium of the disk. Reflected portions of the beam can be received using a photo detector near the laser source or on a branch from the source axis to enable monitoring of the reflectivity for beam power control purposes.

Figure 5:
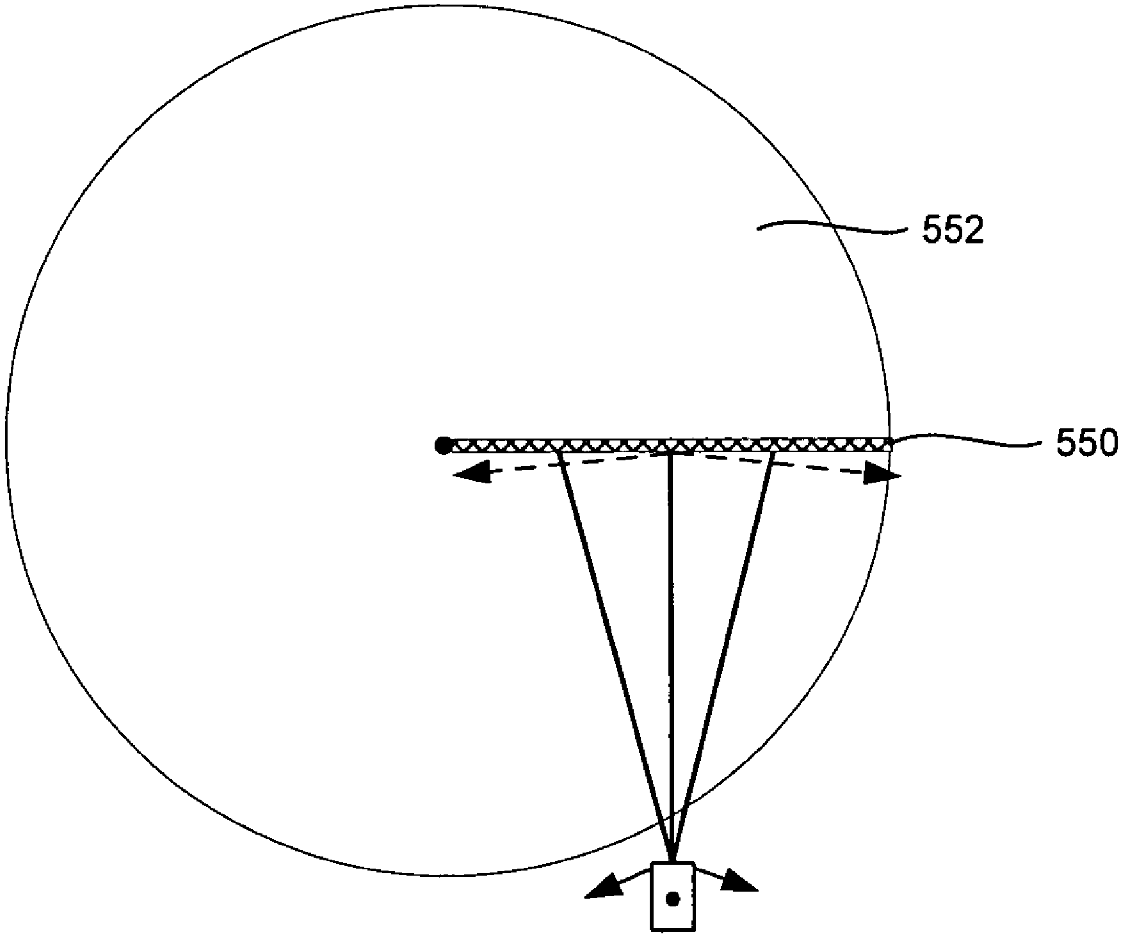
FIG. 5 illustrates a view of a device for optical scanning where a mirror bar is perpendicularly oriented with respect the direction of optical disk rotation in accordance with an embodiment of the present invention.

FIG. 5 illustrates an embodiment of a mirror bar 550 where the mirror bar does not cross the optical disk 552 on a geometric chord of the disk. In contrast, the optical bar of this alternative embodiment is configured to cross the optical disk in an orientation that is substantially perpendicular to the direction of rotation. In one embodiment, the optical bar is positioned at a radius of the optical disk.

Figure 6A:
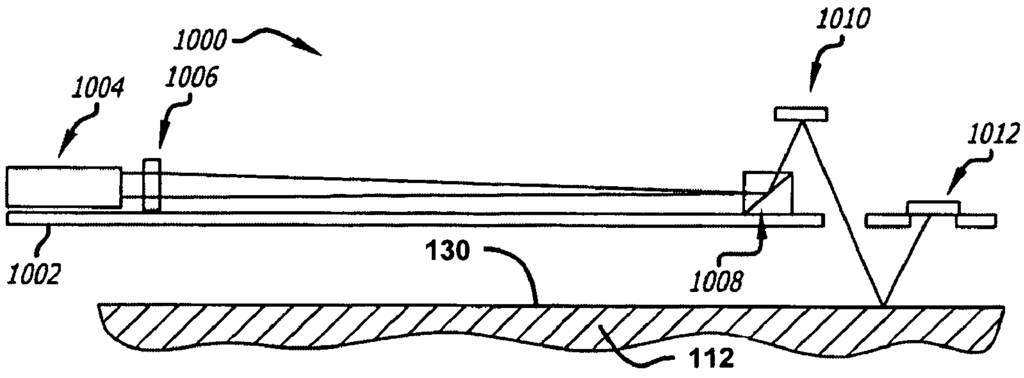
FIGS. 6A and 6B are side and top views respectively of an example embodiment of a disc labeling apparatus including a reflective grating for providing a tracking signal according to an embodiment of the present invention.
Figure 6B:
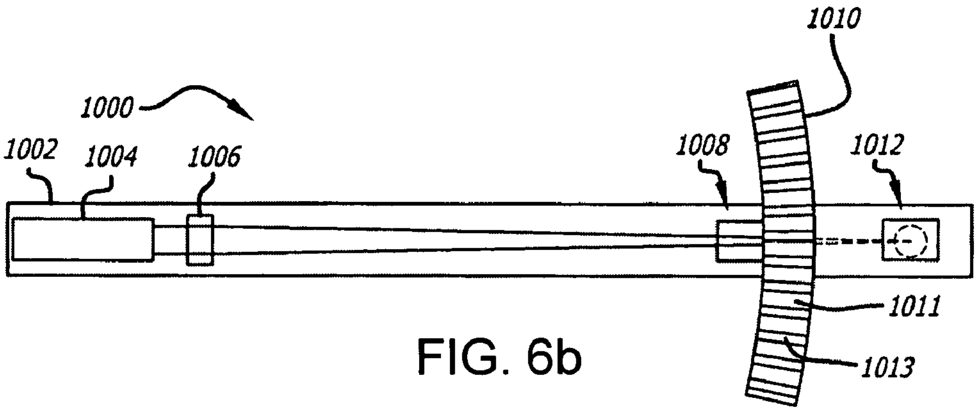

Referring to FIGS. 6A and 6B, in an example embodiment, a disc labeling apparatus 1000 includes a supporting arm 1002, a laser source 1004, a shaping lens 1006, a mirror 1008, a reflective grating 1010 and a reflection photodiode 1012, configured as shown. The disc labeling apparatus 1000 provides a mechanism for determining radial position. Instead of reflecting the incident light downward to the disc surface, the mirror 1008 is positioned to reflect light upward to the reflective grating 1010. In an example embodiment, the reflective grating 1010 is designed such that track centers 1011 are fully reflective, while in the regions 1013 between tracks the grating 1010 is non-reflective. The grating 1010 is attached to a fixed member such as the outer casing of the drive. As the arm moves rotationally with respect to the disc and the grating 1010, the light moves from high reflectivity to low reflectivity regions of the grating 1010 and back. The light reflected from the grating 1010 strikes the disc and then the reflected light photodetector 1012. The photodetector output is high when the grating 1010 is reflective, low when the grating 1010 is non-reflective, and somewhere in between when the beam strikes partway between the two types of surfaces. By detecting cycles of high and low output of the photodiode, track crossings can be counted and relative radial position can be tracked.

Figure 6C:
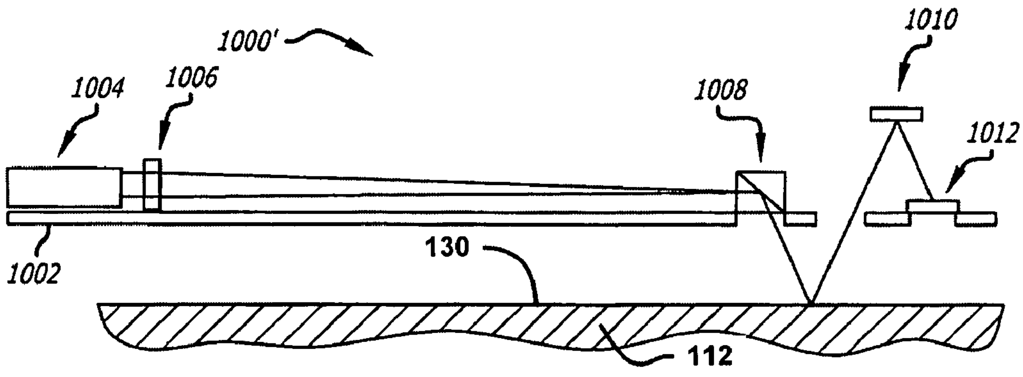
FIG. 6C is a side view of an alternate example embodiment of a disc labeling apparatus including a reflective grating for providing a tracking signal according to an embodiment of the present invention

FIG. 6C shows an alternate example embodiment of a disc labeling apparatus 1000' which is similar to the disc labeling apparatus 1000 except that the mirror 1008 is instead configured as shown to reflect the laser beam toward the label side 130 such that the laser beam is reflected by the label side 130 toward the reflective grating 1010, and then reflected by the reflective grating 1010 toward the photodetector 1012.

In an example embodiment, an apparatus for a disc with a label side and a data side, the label side including a layer of material that undergoes a chemical reaction in response to energy, including a housing, a laser source for generating a laser beam, a reflective grating fixed in position in relation to the housing, a mirror for directing the laser beam toward the reflective grating, and a photodetector positioned to detect light reflected by the reflective grating for providing a tracking signal. In an example embodiment, the means for directing includes a mirror. In an example embodiment, the mirror is configured to reflect the laser beam directly toward the reflective grating. In an example embodiment, the mirror is configured to reflect the laser beam toward the label side such that the laser beam is reflected by the label side toward the reflective grating. In an example embodiment, the apparatus further includes an optical pickup unit (OPU) facing the data side.

In an example embodiment, a method includes providing a medium including material that forms an optically visible spot in response to energy of a predetermined wavelength, and imparting energy of the predetermined wavelength to the material through a fixed-focus lens arrangement. In an example embodiment, the method further includes illuminating a label side of the medium with a light source, and reading identification data from the label side when the label side is illuminated by the light source. In an example embodiment, the method further includes determining, simultaneously with the identification data being read, a media type for the media. In an example embodiment, the method further includes generating an optical power calibration (OPC) signal in response to light reflected from the media. In an example embodiment, the method further includes measuring outgoing power of the energy. In an example embodiment, the method further includes sensing light returning from the media.

Figure 7A:
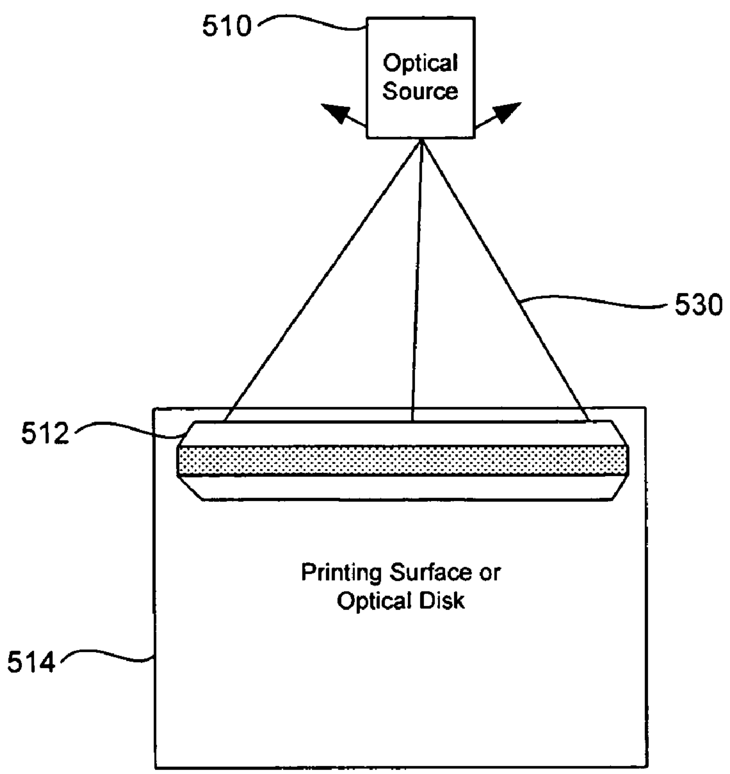
FIG. 7*a* illustrates an optical scanning device using a polygon mirror in accordance with an embodiment of the present invention.

FIG. 7*a* illustrates another embodiment of an optical scanning device for an optical disk. An optical source 510 is capable of emitting a beam or laser 530. Then a first polygon mirror 512 is oriented with an axis that is substantially parallel in relation to the printing surface or optical disk 514. The polygon mirror includes a plurality of mirror surfaces that are capable of reflecting the beam toward the optical disk. In addition, a pivot may be coupled to the polygon mirror, and the pivot may be configured to rotatably move the polygon mirror and reflect the beam at a plurality of angles onto the printing surface or optical disk.

Figure 7B:
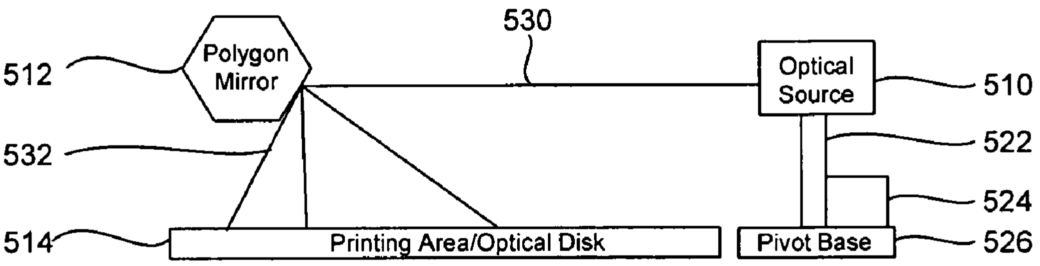
FIG. 7*b* illustrates a side view of the optical scanning device of FIG. 7*a* using a polygon mirror in accordance with an embodiment of the present invention.

FIG. 7*b* illustrates a side view of the optical scanning device of FIG. 7*a* for an optical disk. The optical source 510 is capable of emitting a beam 530. The optical source 510 can be attached to a pivot 522 attached to a pivot base 526 and then moved by a motor 524. Then a first polygon mirror 512 is oriented with an axis that is substantially parallel in relation to the printing surface or optical disk 514. The beam 530 travels from the optical source and then reflects off the second polygon mirror 532 toward the printing area. In such a manner the beam 530 can impinge a two-dimensional printing surface 514 even if the surface 514 is stationary.

Figure 8A:
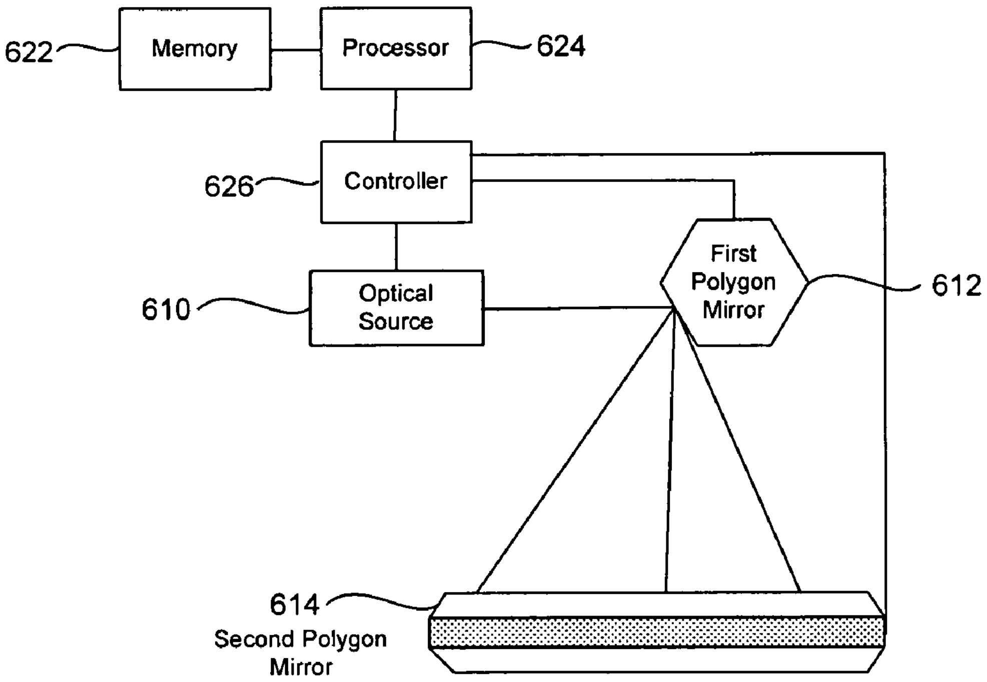
FIG. 8*a* illustrates an optical scanning device using two polygon mirrors in accordance with an embodiment of the present invention.
Figure 8B:
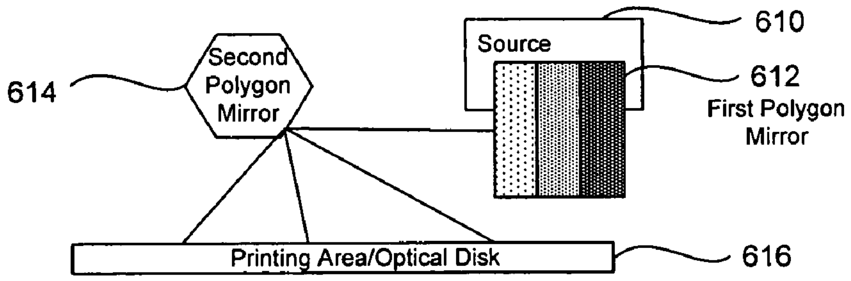
FIG. 8*b* illustrates a side view of an optical scanning device as in FIG. 8*a* using two polygon mirrors in accordance with an embodiment of the present invention.

FIGS. 8*a* and 8*b* illustrate an embodiment of an optical scanning device using two polygon mirrors. An optical source 610 is provided that is capable of emitting a beam. The beam is directed toward and reflected off of a first polygon mirror 612 that is oriented substantially perpendicular with respect to the optical disk and then the beam may be reflected to a second polygon mirror 614. Due to the rotation of the two polygon mirrors in this embodiment, the optical source may remain fixed.

The second polygon mirror 614 is located near the printing area or optical disk in an orientation that allows defined areas or disk tracks to be written onto or read from. For example, the second polygon mirror may be located parallel and adjacent to the printing area. To reiterate, the first polygon mirror reflects the beam to the second polygon mirror which in turn directs the beam toward the optical disk. Angle sensors can be included with the polygon mirrors to track the angle orientation of each mirror at any given time.

Each polygon mirror may be controllably rotated to enable a wide coverage of a printing area or optical tracks to be quickly addressed. In particular, the polygon mirror embodiment is suited for covering two-dimensional areas by sweeping the beam across the area in two-dimensions. The two-dimensional area may be fixed or the area may be moved in order to allow the beam to access areas where the mirror span is smaller than the width or length of the media, or where a single polygon mirror is used.

The second polygon mirror 614 has a plurality of mirror surfaces that are configured to reflect the beam onto the printing area or optical disk 616 (only shown in FIG. 8*b*). A pivot is coupled to each of the polygon mirrors. The pivots are configured to enable the polygon mirror to reflect the beam at a plurality of angles onto the optical disk. The pivots and mirrors can also be connected to pivot bases. In an alternative embodiment, only one polygon mirror will rotate and the other will remain fixed.

All of the embodiments described herein can be applied to two-dimensional areas of any shape. In addition, many of the embodiments of the invention are specifically useful for optical disks. The present embodiment can print or develop any surface that has a light sensitive coating. For example, in one embodiment the coating absorbs the laser light, converts the laser light to heat, the heat melts a developer, which in turn contacts a leucodye, to cause a change in one or more of contrast, darkness, or color of the location so as to form a visible spot.

In a further embodiment, the polygon mirrors spin at a constant rate and the time at which the beam is activated determines where the beam will arrive at the optical disk. This also may enable the beam to sweep across areas of the optical disk as desired. Pivot motors may be coupled to pivots for the mirrors and the pivot motors may run a constant rate or be directed to move the mirrors to specific locations.

Using the polygon mirrors allows the system to use a long focal length beam. The use of polygon mirrors may reduce the moving parts and simplify the design and assembly of the optical head used to form the optical images on the optical disk or printing area. The use of the two polygon mirrors also allows the optical head to write images in two dimensions across an optical disk without pivoting the optical head.

In order to provide position registration, the two polygon mirrors may have optical encoders on their shafts that engage with reflective or transmissive optical encoder sensors fixed near the mirrors. The encoders can be used to provide timing information that can lock the beam scanning to the image data or to the spinning of the optical disk. The beams can be scanned slowly to accommodate slow dye layer chemistries. Sufficient encoder wheel resolution may enable slower optical disk spin rates, if desired. Alternatively, the timing information from the encoder wheels can provide disk spin speed information to which the print clock can be adjusted.

In various embodiments, a controller 626, as illustrated in FIG. 8*a*, may orchestrate the movement of the various system components (e.g. pivoting of the optical head, rotation or translation of the medium, and/or rotation of the polygon mirrors) and the activation of the beam to form the visible spots on the medium. The controller 626 may orchestrate the movement and activation in accordance with data representative of a desired image in order to generate the image via the arrangement and characteristics of the spots formed on the medium. In some embodiments, the controller includes a processor 624 coupled to a processor-readable medium such as a memory 622. The memory 622 may contain processor-executable instructions which, when executed by the processor 624, cause the processor 624 to orchestrate the movement and activation, among other activities.

Figure 9:
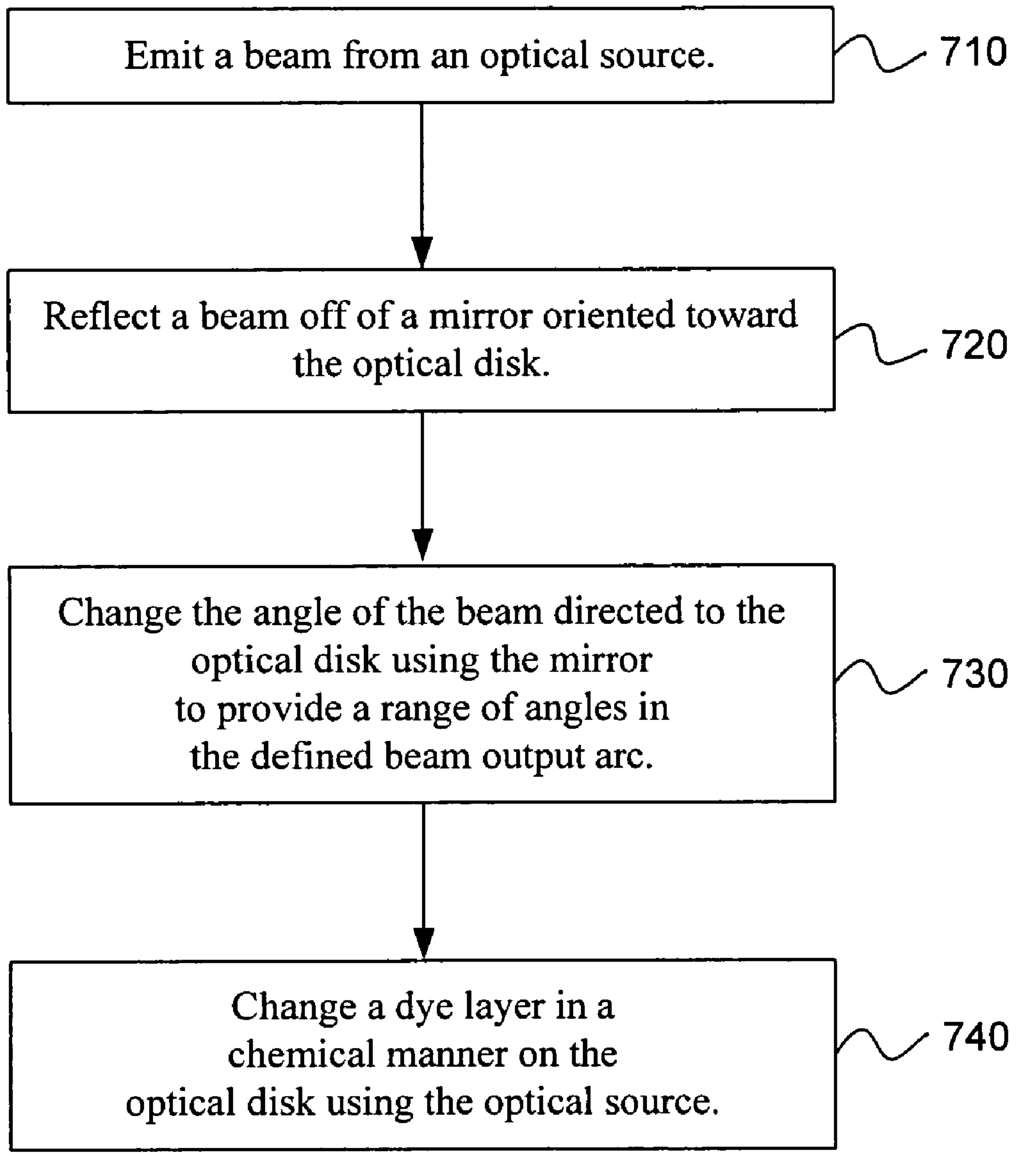
FIG. 9 is a flow chart illustrating example operations for label forming according to an embodiment of the present invention.

FIG. 9 is a flow chart illustrating a method for optically forming a visible image onto a label region of an optical disk. The method can include the step of emitting a beam from an optical source, as in block 710. The beam may be a laser source that is emitted. Another step is reflecting a beam off of a mirror oriented toward the optical disk, as in block 720. The mirror can be a mirror bar that allows the beam to access all parts of the optical disk. The angle of the beam directed to the optical disk can be changed using the mirror, as in block 730. In one embodiment, a pivot may be used to move the mirror and to provide a range of angles in the defined beam output arc for access to a greater area of the optical disk than might otherwise be available using the mirror alone. A dye layer may then be changed in a chemical manner on the optical disk using the optical source, as in block 740. When the change occurs then the light reflected off the optical disk may be viewed by an end user as an image, text, or a pattern.

In some embodiments of the method the pivot is attached to the mirror(s), while in other embodiments the pivot is attached to the optical source. The mirror may by rotated by using the pivot. The operation of receiving data corresponding to the image into a controller can then be performed. Once the data is received the controller can steer the beam in accordance with the data to form the image. In an additional embodiment, the medium can be moved in accordance with the data to form the image. For example, the medium may be rotated or translated.

It is to be understood that the above-described compositions and modes of application are only illustrative of embodiments of the present device and method. Numerous modifications and alternative arrangements may be devised by those skilled in the art without departing from the spirit and scope of the present invention and the appended claims are intended to cover such modifications and arrangements. Thus, while the present embodiments have been described above with particularity and detail in connection with what is presently deemed to be the some practical preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An optical scanning device for marking an optically sensitive layer, comprising:

an optical source being configured to emit a beam;

a pivot coupled to the optical source, the pivot being configured to enable the beam to travel through a beam output arc; and a mirror surface oriented toward the optically sensitive layer, the mirror surface operation being independent of movement of the pivot and being configured to reflect the beam within the defined beam output arc onto a plurality of locations of the optically sensitive layer.

2. An optical scanning device as in claim 1, wherein the optically sensitive layer is part of an optical disk.

3. An optical scanning device as in claim 2, wherein the mirror surface is oriented toward the optical disk at a location that allows each track on the disk to be reached.

4. An optical scanning device as in claim 1, wherein the mirror surface is a mirror bar.

5. An optical scanning device as in claim 1, wherein the mirror bar is patterned with alternating reflective and non-reflective bars.

6. An optical scanning device as in claim 1, wherein the mirror surface is a curved mirror surface.

7. An optical scanning device as in claim 6, wherein the curved mirror surface is concave toward the center of the optical disk.

8. An optical scanning device as in claim 1, further comprising a pivot base to which the pivot is attached.

9. An optical scanning device as in claim 1, further comprising a pivot motor coupled between the pivot and the pivot base.

10. An optical scanning device as in claim 1, wherein the optical source is a laser source.

11. An optical scanning device as in claim 1, wherein the mirror surface is a straight mirror surface.

12. An optical scanning device as in claim 1, wherein the mirror surface further comprises:

a first polygon mirror oriented over the optically sensitive layer, and a plurality of mirror surfaces being configured to reflect the beam onto the optically sensitive layer; and a second pivot coupled to the polygon mirror, the second pivot being configured to enable the polygon mirror to reflect the beam at a plurality of angles onto the optically sensitive layer.

13. An optical scanning device for an optically sensitive layer, comprising:

an optical source configured to emit a beam;

a first pivot coupled to the optical source, the pivot being configured to enable the beam to travel through a beam output arc;

a first polygon mirror oriented over the optically sensitive layer, and a plurality of mirror surfaces being configured to reflect the beam onto the optically sensitive layer wherein a first polygon mirror operation is independent of movement of the first pivot; and a second pivot coupled to the polygon mirror, the second pivot being configured to enable the polygon mirror to reflect the beam at a plurality of angles onto the optically sensitive layer.

14. An optical scanning device as in claim 13, wherein the optically sensitive layer is an optical disk having tracks.

15. An optical scanning device as in claim 14, wherein the first polygon mirror is located near the optical disk in an orientation that allows each track on the disk to be written to.

16. An optical scanning device as in claim 14, wherein the first polygon mirror rotates to enable each track on the optical disk to be written to.

17. An optical scanning device as in claim 13, further comprising a pivot base to which the second pivot is mounted.

18. An optical scanning device as in claim 13, further comprising a pivot motor coupled to the second pivot.

19. An optical scanning device as in claim 13, further comprising a second polygon mirror configured to reflect the beam from the optical source to the first polygon mirror.

20. An optical scanning device as in claim 19, wherein the second polygon mirror is arranged in an orientation with an axis parallel to the optical disk and the first polygon mirror has an axis that is perpendicular with respect to the optical disk.

21. An optical scanning device as in claim 13, wherein the optical source is a laser source.

22. An optical scanning device for an optical disk, comprising:

an optical source means for emitting a beam at a frequency for modifying an optical disk;

a pivot means for pivoting the laser source through a defined beam output arc, the pivot means being coupled to the optical source;

a pivot motor means for moving the pivot means, the pivot means being coupled between the pivot and the pivot base; and a mirror means, oriented at an angle toward the optical disk, for reflecting the beam from the optical source means onto the optical disk over a range of angles in the defined beam output arc, the mirror means operation being independent of pivoting of the pivot means.

23. An optical scanning device as in claim 22, wherein the mirror means is a mirror bar.

24. An optical scanning device as in claim 22, wherein the mirror means is located over the optical disk at a location that allows each track on the disk to be written to.

* * * * *

UNITED STATES PATENT AND TRADEMARK OFFICE

CERTIFICATE OF CORRECTION

PATENT NO. : 7,639,272 B2
APPLICATION NO. : 11/263724
DATED : December 29, 2009
INVENTOR(S) : D. Mitchel Hanks et al.

It is certified that error appears in the above-identified patent and that said Letters Patent is hereby corrected as shown below:

In column 10, line 45, in Claim 13, delete "layer" and insert -- layer, --, therefor.

Signed and Sealed this

Twenty-eighth Day of September, 2010

David J. Kappos

*Director of the United States Patent and Trademark Office*